Oct. 27, 1959  E. E. HUPP  2,910,051
PNEUMATIC BRAKE VALVE TO PROVIDE FEEL
Filed May 16, 1957

INVENTOR.
EDWARD E. HUPP
BY
William P. Hickey
ATTORNEY

United States Patent Office 2,910,051
Patented Oct. 27, 1959

2,910,051

PNEUMATIC BRAKE VALVE TO PROVIDE FEEL

Edward E. Hupp, South Bend, Ind., assignor to Bendix Aviation Corporation, South Bend, Ind., a corporation of Delaware Application May 16, 1957, Serial No. 659,598

7 Claims. (Cl. 121—46.5)

The present invention relates generally to fluid pressure control systems; and more particularly to pneumatic systems for the control of automotive tractor-trailer braking systems and the like.

An object of the present invention is the provision of a new and improved fluid pressure control system comprising a pair of fluid pressure servo-motor control valves controllable by a single pressure modulated signal, one of which control valves produces a reaction to said control signal over its full range of operation, and the other of which has an initial period in which no reaction is produced upon the input signal, whereby the initial stage of power output of the two servo-motors is appreciably greater in said last mentioned control valve than is the case for the servo-motor controlled by the first mentioned control valve—said difference in power output being accomplished in the preferred embodiment by a slight modification of structure in the two servo-motor control valves, which modification is simple and rugged in design, efficient and reliable in its operation, and inexpensive to manufacture.

Another object of the present invention is the provision of a new and improved control valve having a high pressure, a low pressure and a control pressure chamber two of which are separated by means of a movable wall; the control valve further including a tubular flow conducting control member extending through the movable wall in a manner permitting relative movement without transmitting force from the movable wall to the tubular control member, said valve being actuated by movement of said control member towards the movable wall and said chambers being positioned such that valve actuation causes the diaphragm to move in the opposite direction—the combination of structure further including first abutment means on said tubular member against which said movable wall may abut, second abutment means spaced apart from said first abutment means, and means biasing the movable wall away from said first abutment into engagement with said second abutment means, whereby the initial stage of valve actuation does not produce a reaction upon the control member.

Figure 1:
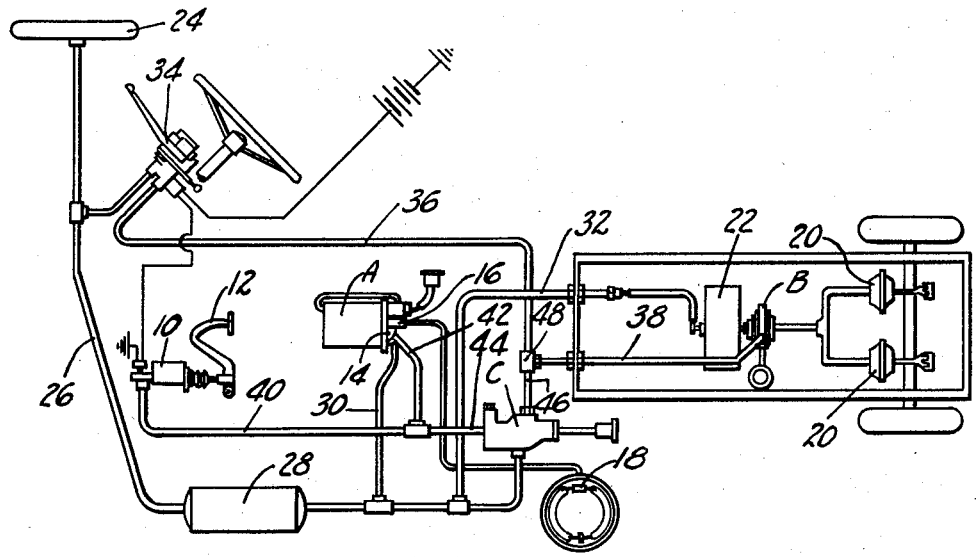
Figure 2:
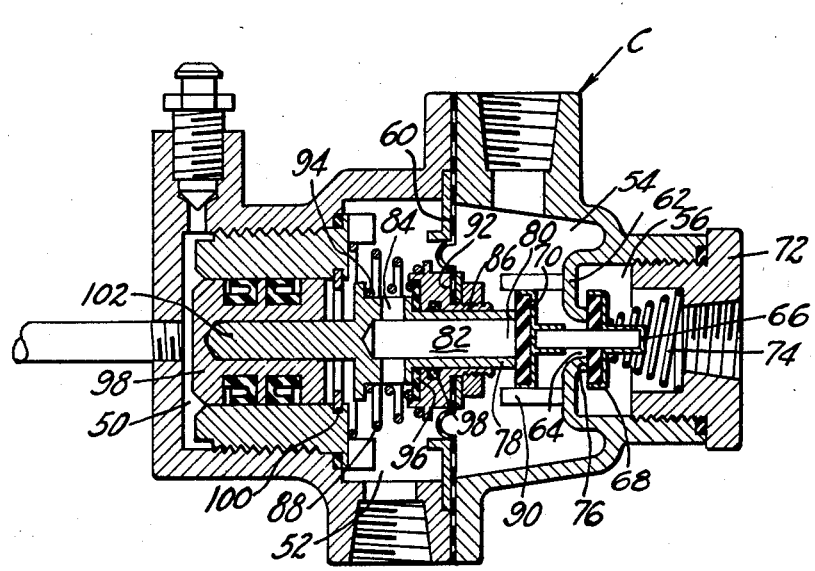

Further objects and advantages will become apparent to those skilled in the art to which the invention relates from the following description of the preferred embodiment described with reference to the accompanying drawing forming a part of this specification, and in which:

Figure 1 is a diagrammatic view of a tractor-trailer automotive braking system embodying the principles of the present invention; and Figure 2 is a cross-sectional view of a new and improved control valve embodying further principles of the present invention.

The automotive tractor-trailer braking system shown in Figure 1 is what is known as a vacuum over hydraulic system in which the brake applying motors in the tractor portion of the vehicle are actuated by means of hydraulic pressure; and in which the brake applying motors on the trailer portion of the vehicle are operated by means of vacuum. The hydraulic braking system of the tractor comprises a master cylinder 10 operated by the usual foot pedal lever 12, and the hydraulic output pressure of which is communicated to the control valve 14 of a vacuum powered fluid pressure servo-motor A. The fluid pressure servo-motor A is equipped with an auxiliary hydraulic master cylinder 16 whose discharge pressure will normally be amplified with respect to the input signal from the master cylinder 10, and which discharge pressure operates the brake applying wheel cylinders 18 of the tractor portion of the braking system of the vehicle. It is usual in this type of system to provide means in the fluid pressure servo-motor A for permitting the wheel cylinders 18 to be operated directly from the master cylinder 10 during power failure of the servo-motor A.

The brakes of the trailer portion of the vehicle are operated by means of vacuum powered motors or dishpans 20 having movable elements which are moved forwardly to apply the trailer's brakes when vacuum is supplied thereto. A vacuum reservoir 22 is mounted on the trailer portion of the vehicle; and a pneumatically actuated control valve B is interpositioned between the vacuum reservoir 22 and the dishpans 20 to normally supply atmospheric pressure to the disphan during the released condition of the brakes, and to dump vacuum into the dishpans 20 from the reservoir 22 to apply the trailer's brakes. Vacuum is supplied to the fluid pressure servomotor A and the vacuum reservoir 22 from the manifold 24 of the vehicle's propelling engine through lines 26, reservoir 28, and branch lines 30 and 32 respectively. The prior art braking systems with which I am familiar also provide a hand control valve 34 mounted upon the steering column of the tractor for controlling the operation of the trailer's pneumatically actuated control valve B. In the preferred arrangement, the pneumatically actuated control valve B will provide a released condition of the trailer brakes when vacuum of a predetermined intensity is delivered to the control valve B by the hand control valve 34 through the interconnecting control lines 36 and 38. The hand control valve is so constructed that full atmospheric pressure is supplied to the control valve B by the hand control valve 34 when a complete trailer brake application is made. The system so far described is generally old in the art and for a more complete understanding of the construction and operation of the above described system, reference may be had to the Earl R. Price Patent 2,719,609.

It is desirable in systems of the above described type to provide a braking application in the trailing portion of the vehicle which will "lead" the initial braking effort of the tractor to prevent a rapid reversal of forces in the connection between the leading and trailing portions of the vehicle, and to further prevent what is known as "jackknifing." The manufacture of tractor-trailer braking systems is a highly competitive one, and it is desired that the mechanism employed to achieve the desired results be rugged and simple in design, efficient and reliable in its operation, and inexpensive to manufacture.

According to principles of the present invention there is provided a control valve, very similar in construction to the control valve 14 used in the fluid pressure servo-motor A, such that many of their parts are interchangeable to provide the desired lead application of the trailer brakes when supplied with the identical control signal that is supplied to the fluid pressure servo-motor A. The common input signal supplied to the fluid pressure servo-motor A and the control valve C is obtained from the master cylinder 10 through the line 40 and its branch connections 42 and 44; and its control or output pressure is communicated to the trailer braking system through the lines 46, shuttle cock 48, and trailer control line 38. The shuttle cock 48 is identical in construction and operation with the device 42 described in the above referred to Price patent.

The control valve C generally comprises a hydraulic chamber 50, a vacuum chamber 52, a control chamber 54, and an atmospheric chamber 56 arranged in that order. A movable wall or diaphragm 60 separates the vacuum and control chambers 52 and 54, and an integrally cast partition 62 is provided between the control and atmospheric chambers 54 and 56. A centrally located valve port 64 is provided in the partition 62 opposite the diaphragm 60 for providing communication between the atmospheric and control ports 56 and 54 respectively. A spool shaped poppet member 66, having one of its spools or closure members 68 located in the atmospheric chamber 56 and the other of its closure members 70 in the control chamber 54, is provided for regulating flow through the valve port 64. The outer end of the atmospheric chamber 56 is closed off by means of a threaded tubing adapter 72, and a coil spring 74 is positioned between the poppet member 62 and the closure member or tubing adapter 72 to bias the outer spool 68 into engagement with the atmospheric valve seat 76.

Communication between the vacuum chamber 52 and the control chamber 54 is provided by means of a tubular flow conducting control member 78 which extends through the diaphragm 60, and the open end of which is adapted to abut the inner flange or closure member 70 of the poppet member 66. Communication between the vacuum chamber 52 and the inner opening 82 of the tubular control member is provided by means of lateral drillings 84 located in the vacuum chamber 52, and fluid flow through the control member 54 is regulated by abutment of the open end of the tubular control member 78 with the inner closure member 70 of the poppet member 66.

The control valve C is constructed and arranged to provide full manifold vacuum to the pneumatically actuated control valve B during the normal or released condition of the vehicle braking system. In the normal or released condition of the control valve C, the tubular flow conducting control member 78 is biased to a position to the left of the lapped condition shown in Figure 2, such that the open end 80 of the tubular control member 78 is held out of engagement with the inner closure member 70 of the poppet member 66. In the released condition therefore, continuous communication between the vacuum chamber 52 and the control chamber 54 is provided through the open end 80, passage 82 and lateral drillings 84 in the tubular control member 78.

According to the provisions of the present invention a connection is provided between the diaphragm 60 and the tubular control member 78 which will provide a seal therebetween, and yet accommodate relative axial movement; and which seal in the preferred embodiment comprises a relatively frictionless sliding sealing arrangement which transmits a minimum of force between the diaphragm 60 and the control member 78. The preferred arrangement further includes a coil spring 88 which biases the diaphragm 60 in the direction of the control member's actuating movement, and which provides a predetermined force which holds the diaphragm structure into engagement with abutment surfaces 90 that are mounted on and project axially from the integrally cast partition 62. The sliding seal 86 is accomplished with respect to a reduced diameter section of the control member 78 such that there is provided a shoulder 92 at one end of the reduced diameter section against which the diaphragm structure 60 may be biased to transmit reactive forces from the diaphragm to the control member 78 during actuation of the valve. With such an arrangement, the diaphragm 60 will be held into engagement with the abutment surface 90 by the coil spring 88 during the normal or released condition of the vehicle brakes, and the open end 80 of the control member 78 is held out of engagement with the closure member 70 of the poppet member 66.

Actuation of the valve is brought about by moving the control member 78 to the right as seen in Figure 2, until its end 80 moves into engagement with the poppet member 68 to close off further communication between the vacuum chamber 52 and control chamber 54. A slight additional amount of control member movement to the right lifts the outer spool 68 of the poppet member 66 from the atmospheric valve seat 76 to raise the pressure in the control chamber 54. Inasmuch as the coil spring 88 holds the diaphragm 60 into engagement with the abutment surfaces 90 until a predetermined pressure differential is developed across the diaphragm 60, substantially no reactive forces developed across the diaphragm 60 by reason of the rise in pressure in the control chamber 54 will be initially transmitted to the control member 78 to oppose the control valve's initial actuating movement. The closure member 68 of the poppet 66 will therefore remain out of engagement with the atmospheric port 76 until such time as the pressure within the control chamber 54 reaches a predetermined intensity above that in the vacuum chamber 52; at which time the force exerted by the spring 88 will be overcome and the diaphragm 60 will be moved, to the left as seen in Figure 2, into engagement with the shoulder 92 on the control member 78. After this is accomplished, any slight additional rise in pressure in the control chamber 54 will exert a reactive force against the control member 78, to the left as seen in Figure 2, permitting the closure member 68 to close off further communication between the air and control chambers 56 and 54 respectively, such that the lapped condition as seen in Figure 2 is reached—during which condition no further change is experienced in the pressure intensity within the control chamber 54. Movement of the control member 78 away from the poppet member 66, or to the left as seen in Figure 2, permits the end 80 of the control member 78 to move out of engagement with the closure member 70 to permit vacuum from the chamber 52 to again be communicated with the control chamber 54. If the amount of force being exerted upon the control members 78 in the direction of the poppet member 66 has not been decreased greatly, and if the control pressure in the chamber 54 was at a level appreciably above the predetermined pressure at which spring 88 can hold the diaphragm 60 into engagement with the abutment surfaces 90, a slight decrease in the pressure within the control chamber 54 will of course reduce the forces exerted upon the diaphragm and hence the reactive forces delivered to the control member 78, such that the movable member 78 will again move into engagement with the poppet member 66 when the pressure within the control chamber 54 decreases to an intensity balancing the force being held upon the control member 78. A complete relaxation of force upon the control member 78, of course, will permit the end 80 of the control member to remain out of engagement with the poppet member 66 and the diaphragm 60 to move into engagement with the abutment surfaces 90. Thereupon full manifold vacuum existing in the vacuum chamber 52 is delivered to the control chamber 54 to again establish the normal or released condition of the control valve C.

While the following may or may not be necessary to provide an operable valve, the unit will preferably include a return spring 94 for urging the control member 78 out of engagement with the poppet member 66, and thereby assure substantially equal pressures in the vacuum and control chambers 52 and 54 respectively during the release condition of the unit. The unit will further preferably include a washer 96 or its equivalent made of a non-metallic material and positioned between the shoulder 92 and the movable wall or diaphragm structure 60 to prevent audible noises or "clicking" when the movable wall or diaphragm structure is rapidly brought into engagement with the shoulder during a quick application of the brakes. There is also provided, in the preferred arrangement, an O-ring seal 98 between the diaphragm 60 and the tubular control members 78 to hold vacuum leakage between the vacuum and control chambers through the sliding seal 86 to a minimum.

The structure above described has utility regardless of the manner in which the control member 78 is actuated and regardless of the system in which it is used. There are, however, particular advantages to be obtained when the control valve structure C above described is used in conjunction with the automotive tractor-trailer braking system shown and described with reference to Figure 1 of the drawing. As previously mentioned the control valve structure 14 which controls the fluid pressure servo-motor A is very similar in construction to that shown in Figure 2—differing principally in the manner in which the reactive forces generated upon the movable wall 60 are delivered to the control members 78 of the respective valves. In the control valve 14 which is used for the control of the fluid pressure servo-motor A, the reactive forces generated upon its reaction diaphragm are delivered to its control member at all times, even during the initial stages of the control valve actuation. The control valve 14 therefore supplies an output pressure to the servo-motor A which is at all times substantially directly proportional to the pressure signal generated by the master cylinder 10. In the control valve C, substantially no reactive forces are delivered to its control member 78, during the initial stage of its actuating movement. There is, therefore, immediately provided a substantially predetermined output or control pressure which is delivered to the trailer braking system at the very beginning of a vehicle brake application. After this predetermined control pressure has been developed, the output or control pressure from the control valve C will be increased in a manner generally proportional to the increase in intensity of the control valve's C input signal. As previously stated, the control valve C is controlled or operated by means of the hydraulic pressure signal from the master cylinder 10. Pressure from the master cylinder 10 is conducted to the hydraulic chamber 50 by means of the branch connection 44; and a suitable piston or movable wall 98 is provided in the hydraulic chamber 50 for converting the pressure signal into movement for the actuation of the control member 78. The piston 98 is held within the hydraulic chamber 50 by a snap ring 100, and suitable abutment means 102 are provided between the piston 98 and the control member 78 to transmit valve actuating movement of the piston 98 to the control member 78.

It will be seen that the objects heretofore enumerated as well as others have been accomplished and that there has been provided a new and improved automotive tractor-trailer braking system in which an initial, generally predetermined amount of braking effort will be delivered to the trailer brakes at the very start of each vehicle brake application—which predetermined amount of braking effort will lead, and be greater than that initially generated in the tractor portion of the vehicle braking system; and which objectives are accomplished by a pair of valves having a maximum of identical parts to make the system economical to manufacture.

While the invention has been described in considerable detail, I do not wish to be limited to the particular constructions shown and described, and it is my intention to cover hereby all adaptations, modifications and arrangements thereof which come within the practice of those skilled in the art to which the invention relates.

I claim:

1. In a control valve: a body member having a high pressure chamber, a low pressure chamber, and a control pressure chamber, said control pressure chamber being normally maintained at pressures equal to or approaching the pressure of one of said high and low pressure chambers; a movable wall separating said control chamber from said one of said high and low pressure chambers; valve means for controlling communication between said chambers, said valve means including a tubular fluid conducting control member extending through said movable wall sealing means between said movable wall and said tubular member which will accommodate relative movement without transmitting appreciable force to said tubular member; said valve means being so constructed and arranged that movement of said tubular member in one axial direction communicates said control chamber with the other of said high and low pressure chambers to produce a differential pressure across said movable wall urging said movable wall in the opposite axial direction; means biasing said movable wall in said one direction; first abutment means against which said movable wall is urged by said spring means until a predetermined pressure differential is experienced across said movable wall, and second abutment means on said tubular member against which said movable wall is urged when said pressure differential exceeds said predetermined differential, there normally being sufficient clearance between said movable wall and said first and second abutment means to permit normal actuation of said valve means by said tubular control member.

2. In a control valve: a body member having a high pressure chamber, a low pressure chamber, and a control pressure chamber, said control pressure chamber being normally maintained at pressures equal to or approaching the pressure of one of said high and low pressure chambers; a diaphragm structure separating said control chamber from said one of said high and low pressure chambers; valve means for controlling communication between said chambers, said valve means including a tubular fluid conducting control member extending through said diaphragm, sealing means between said movable wall and said tubular member which will accommodate relative movement without transmitting appreciable force to said tubular member; said valve means being so constructed and arranged that movement of said tubular member in one axial direction communicates said control chamber with the other of said high and low pressure chambers to produce a differential pressure across said diaphragm urging said diaphragm in the opposite axial direction; spring means biasing said diaphragm in said one direction; first abutment means against which said diaphragm is urged by said spring means until a predetermined pressure differential is experienced across said diaphragm structure, and second abutment means on said tubular member against which said diaphragm structure is urged when said pressure differential exceeds said predetermined differential, there normally being sufficient clearance between said diaphragm structure and said first and second abutment means to permit normal actuation of said valve means by said tubular control member.

3. In a control valve: a body member having a high pressure chamber, a low pressure chamber, and a control pressure chamber, said control pressure chamber being normally maintained at pressures equal to or approaching the pressure of said low pressure chamber; a movable wall separating said control chamber from said low pressure chamber; valve means for controlling communication between said chambers, said valve means including a tubular fluid conducting control member extending through said movable wall, sealing means between said movable wall and said tubular member which will accommodate relative movement without transmitting appreciable force to said tubular member; said valve means being so constructed and arranged that movement of said tubular member in one axial direction communicates said control chamber with said high pressure chamber to produce a differential pressure across said movable wall urging said movable wall in the opposite axial direction; spring means biasing said movable wall in said one direction; first abutment means against which said movable wall is urged by said spring means until a predetermined pressure differential is experienced across said movable wall, and second abutment means on said tubular member against which said movable wall is urged when said pressure differential exceeds said predetermined differential, there normally being sufficient clearance between said movable wall and said first and second abutment means to permit normal actuation of said valve means by said tubular control member.

4. In a pneumatic control valve: a body member having a low pressure chamber, a control pressure chamber, and a high pressure chamber, in that order, said control pressure chamber being normally maintained at pressures equal to or approaching the pressure of said low pressure chamber; a diaphragm structure separating said control chamber from said low pressure chamber and a partition separating said control and high pressure chambers positioned opposite said diaphragm, a valve port in said partition for communicating said control and high pressure chambers, a poppet valve for closing said port and constructed and arranged to open said port when moved away from said diaphragm, a tubular fluid conducting control member extending through said diaphragm toward said poppet valve, said diaphragm structure including means surrounding said tubular member for providing a sealing connection between said diaphragm structure and said tubular member, and said tubular member and poppet valve being constructed and arranged to close off said tubular member when said tubular member moves into engagement with said poppet valve; spring means biasing said diaphragm toward said partition; first abutment means against which said diaphragm is urged by said spring means until a predetermined pressure differential is experienced across said diaphragm structure, and second abutment means on said tubular member against which said diaphragm structure is urged when said pressure differential exceeds said predetermined differential, there normally being sufficient clearance between said diaphragm structure and said first and second abutment means to permit normal actuation of said valve means by said tubular control member.

5. In a pneumatic control valve: a body member having a hydraulic chamber, a low pressure chamber, a control pressure chamber, and a high pressure chamber, in that order, said control pressure chamber being normally maintained at pressures equal to or approaching the pressure of said low pressure chamber; a diaphragm structure separating said control chamber from said low pressure chamber and a partition separating said control and high pressure chambers positioned opposite said diaphragm; a valve port in said partition for communicating said control and high pressure chambers, a poppet valve for closing said port and constructed and arranged to open said port when moved away from said diaphragm, a tubular fluid conducting control member extending through said diaphragm toward said poppet valve, said diaphragm structure including means surrounding said tubular member for providing a sliding sealing connection between said diaphragm structure and said tubular member, and said tubular member and poppet valve being constructed and arranged to close off said tubular member when said tubular member moves into engagement with said poppet valve, spring means biasing said diaphragm toward said partition; first abutment means against which said diaphragm is urged by said spring means until a predetermined pressure differential is experienced across said diaphragm structure, second abutment means on said tubular member against which said diaphragm structure is urged when said pressure differential exceeds said predetermined differential, there normally being sufficient clearance between said diaphragm structure and said first and second abutment means to permit normal actuation of said valve means by said tubular control member, and a movable wall in said hydraulic chamber subjected to hydraulic pressure on its side opposite said diaphragm, whereby a slight amount of hydraulic pressure is capable of actuating said control valve until said diaphragm moves into engagement with said second abutment and following which considerably higher hydraulic pressures are required to produce further changes in control pressure.

6. In a tractor-trailer braking system and the like: first and second servo-motor control valves, said first servo-motor control valve being constructed and arranged to develop reaction against valve actuating movement which reaction commences with initial valve output, and said second servo-motor control valve comprising: a body member having a high pressure chamber, a low pressure chamber, and a control pressure chamber, said control pressure chamber being normally maintained at pressures equal to or approaching the pressure of one of said high and low pressure chambers; a movable wall separating said control chamber from said one of said high and low pressure chambers; valve means for controlling communication between said chambers, said valve means including a tubular fluid conducting control member extending through said movable wall sealing means between said movable wall and said tubular member which will accommodate relative movement without transmitting appreciable force to said tubular member; said valve means being so constructed and arranged that movement of said tubular member in one axial direction communicates said control chamber with the other of said high and low pressure chambers to produce a differential pressure across said movable wall urging said movable wall in the opposite axial direction; means biasing said movable wall in said one direction; first abutment means against which said movable wall is urged by said spring means until a predetermined pressure differential is experienced across said movable wall, and second abutment means on said tubular member against which said movable wall is urged when said pressure differential exceeds said predetermined differential, there normally being sufficient clearance between said movable wall and said first and second abutment means to permit normal actuation of said valve means by said tubular control member.

7. In a tractor-trailer braking system and the like: a hydraulic pressurizing device, first and second servo-motor control valves actuated by said hydraulic pressurizing device, said first servo-motor control valve being constructed and arranged to develop reaction against valve actuating movement which reaction commences with initial valve output, and said second servo-motor control valve comprising: a body member having a hydraulic chamber, a low pressure chamber, a control pressure chamber, and a high pressure chamber, in that order, said control pressure chamber being normally maintained at pressures equal to or approaching the pressure of said low pressure chamber; a diaphragm structure separating said control chamber from said low pressure chamber and a partition separating said control and high pressure chambers positioned opposite said diaphragm; a valve port in said partition for communicating said control and high pressure chambers, a poppet valve for closing said port and constructed and arranged to open said port when moved away from said diaphragm, a tubular fluid conducting control member extending through said diaphragm toward said poppet valve, said diaphragm structure including means surrounding said tubular member for providing a sliding sealing connection between said diaphragm structure and said tubular member, and said tubular member and poppet valve being constructed and arranged to close off said tubular member when said tubular member moves into engagement with said poppet valve, spring means biasing said diaphragm toward said partition; first abutment means against which said diaphragm is urged by said spring means until a predetermined pressure differential is experienced across said diaphragm structure, second abutment means on said tubular member against which said diaphragm structure is urged when said pressure differential exceeds said predetermined differential, there normally being sufficient clearance between said diaphragm structure and said first and second abutment means to permit normal actuation of said valve means by said tubular control member, and a movable wall in said hydraulic chamber subjected to hydraulic pressure on its side opposite said diaphragm, whereby a slight amount of hydraulic pressure is capable of actuating said control valve until said diaphragm moves into engagement with said second abutment and following which considerably higher hydraulic pressures are required to produce further changes in control pressure.

References Cited in the file of this patent

UNITED STATES PATENTS

| | | |
|---|---|---|
| 2,259,809 | Freeman | Oct. 21, 1941 |
| 2,634,742 | Price | Apr. 14, 1953 |